(12) United States Patent
Draisey et al.

(10) Patent No.: US 6,869,048 B2
(45) Date of Patent: Mar. 22, 2005

(54) DE-ORBIT INSTRUMENT PACKAGE

(75) Inventors: Sherry Draisey, King City, CA (US); Mayes Mullins, King City, CA (US)

(73) Assignee: Good Vibrations Engineering Ltd., Nobleton (CA)

( * ) Notice: Subject to any disclaimer, the term of this patent is extended or adjusted under 35 U.S.C. 154(b) by 0 days.

(21) Appl. No.: 10/690,989

(22) Filed: Oct. 23, 2003

(65) Prior Publication Data

US 2004/0124313 A1 Jul. 1, 2004

Related U.S. Application Data

(63) Continuation-in-part of application No. 10/022,858, filed on Dec. 20, 2001, now abandoned.
(60) Provisional application No. 60/256,475, filed on Dec. 20, 2000.

(51) Int. Cl.[7] ............................................. B64G 1/10
(52) U.S. Cl. ................................................. 244/158 R
(58) Field of Search ......................... 244/158 R, 158 A, 244/160, 164

(56) References Cited

U.S. PATENT DOCUMENTS

| | | | | |
|---|---|---|---|---|
| 3,270,908 A | * | 9/1966 | Faget et al. ................. | 220/668 |
| 3,606,212 A | * | 9/1971 | Paine .......................... | 244/162 |
| 4,679,752 A | * | 7/1987 | Wittmann et al. ......... | 244/158 R |
| 5,158,248 A | * | 10/1992 | Mockovciak, Jr. ........... | 244/160 |
| 6,135,391 A | * | 10/2000 | Van Woerkom ........ | 244/158 R |
| 6,467,731 B1 | * | 10/2002 | Harris et al. ................ | 244/160 |

OTHER PUBLICATIONS

Validating NRLMSIS Using Atmospheric Densities Derived From Spacecraft Drag: Starshine Example, Lean et al., 2001 Fall Meeting, Cite Abstracts as Eos Trans. AGU, 92 (47) Fall Meet, Suppl., Abstract xxxxx–xx, 2001, pp. 1 and 2.

* cited by examiner

Primary Examiner—Robert P. Swiatek
(74) Attorney, Agent, or Firm—Nancy E. Hill; Hill & Schumacher

(57) ABSTRACT

An instrument package for carrying on board observation instruments is for launching from space. The instrument includes a housing, a power supply, a communication system and an internal instrument volume. The housing includes a protective skin and adapted to be launched from space. The power supply is secured in the inside of the housing. The communication system is operably connected to the power supply for transmitting data to a location remote from the instrument package. The internal instrument volume is inside the housing and is adapted to receive scientific instrument connectable to the communication system. The instrument package may include an on board control system operably connected to the power supply.

44 Claims, 5 Drawing Sheets

DE-ORBIT INSTRUMENT PACKAGE

CROSS REFERENCE TO RELATED PATENT APPLICATION

This patent application is a continuation-in-part the now abandoned U.S. patent application Ser. No. 10/022,858 filed Dec. 20, 2001 entitled De-Orbit Instrument Package which is incorporated herein by reference which relates to U.S. Provisional Patent Application Ser. No. 60/256,475 filed on Dec. 20, 2000 entitled De-orbit Instrument Package both of which are incorporated herein by reference.

FIELD OF THE INVENTION

The present invention relates to de-orbiting instrument packages for housing scientific instruments and in particular de-orbiting instrument packages adapted to be launched from space.

BACKGROUND OF THE INVENTION

It is well known that it is scientifically useful to obtain information from space. One type of data that is useful is data that is obtained from an instrument that orbits around the earth in decaying fashion herein referred to as de-orbiting.

The two most common existing methods of obtaining de-orbiting observations or de-orbiting data are an instrument launched with a sounding rocket and an instrument on board a small satellite (referred to as a microsat). The sounding rocket launch can generate high vibration and thermal environments. Accordingly the shock and vibration loads which a sounding rocket subjects a small payload (instrument) to are high. For example, a 20 lb payload to be launched on an Orbital Science Viper should be designed to withstand quasi-static loads of approximately 100 g's, while on the shuttle, the same payload should be designed to withstand 40 g's (Reference: Simplified Design Options for STS Payloads by David A. Hamilton, NASA, 1988). The portion of any space payload's weight which is considered structural, rather than functional is from 25% to 50% of the entire payload.

On the other hand, the microsat instrument packages are normally designed for long lifetimes (2–3 years), which require electronics capable of surviving the high radiation environment of space. Rad hardened (electronic details modified to increase survivability in radiation environment) components are particularly expensive, compared to equivalent terrestrial ones. In addition to being expensive, the selection of components which are qualified for high radiation environments are restricted, because only a subset of available terrestrial technologies become qualified for high space radiation environment.

Moreover, a sounding rocket or microsat operation must be carefully planned well in advance and the launch date (and-thus operational date) is normally moved only by a serious geophysical event. Another limitation associated with the sounding rocket is that its shape must be a fairly thin cylinder. The lack of flexibility in the design can represent a major challenge for some types of instruments where the influence of shape can be significant (e.g. optical paths).

Therefore, it would be advantageous to provide a device whose payload design load factors are much lower than can typically be realized with a sounding rocket. Similarly it would be advantageous to provide an instrument package whereby the shock and vibration levels that need to be withstood are reduced as compared to a sounding rocket. Further, it would be also advantageous to provide a device which has more flexibility in the design of the payload; which can be launched at any convenient time with respect to desired observations; and whose observation time for obtaining information can be extended for several days. Still further it would be advantageous to provide an instrument package that can use generally available components rather than rad hardened components.

SUMMARY OF THE INVENTION

The present invention is a de-orbit instrument package for carrying on board observation instruments for launching from space. The instrument includes a housing, a power supply, a communication system and an internal instrument volume. The housing includes a protective skin and is adapted to be launched from space into a de-orbit pattern. The housing has one side and an opposing side and a tie down mechanism which extends from the one side to the opposing side. The power supply is secured in the inside of the housing. The communication system is operably connected to the power supply for transmitting data to a location remote from the instrument package. The internal instrument volume is inside the housing and is adapted to receive scientific instrument connectable to the communication system. The instrument package may include an on board control system operably connected to the power supply.

In another aspect of the invention the space launched de-orbit instrument package for carrying on board observation instruments includes a housing, a power supply, a communication system and an internal instrument volume. The housing includes a protective skin and is adapted to be launched from space into a de-orbit pattern. The housing has a base plate and outer walls. The base plate has stiffness and thermal inertial properties that are greater than those of the outer walls. The power supply is secured in the inside of the housing. The communication system is operably connected to the power supply and is for transmitting data to a location remote from the instrument package. The internal instrument volume inside the housing is adapted to receive at least one scientific instrument connectable to the communication system and the scientific instrument is adapted to be attached to the base plate.

In a further aspect of the invention a process for launching a deorbiting instrument package from a space orbiting platform includes the steps of releasing the package, deploying a chute and orbiting the earth. The instrument package has a chute, a communication system, and instruments including package instruments and at least one scientific instrument. The scientific instrument is operably connected to the communication system. The instrument package is robotically released from the space orbiting platform. The chute is deployed when the instrument package is at a predetermined distance from the space orbiting platform thereby slowing down and stabilizing the instrument package. The instrument package orbits the earth. Data is collected by the instruments and transmitted to a communication receiver.

A number of advantages can be realized by the present invention. Specifically the instrument package provides a means of obtaining high altitude measurements or pictures of the planet or associated materials or atmospheric conditions with near field types of sensors. The instrument package is able to provide a means of obtaining this information for a period of several days. The extended period of observation is helpful for some types of measurements, but required for other types. Further, the instrument package payload design load factors are much lower than can typically be realized with conventional means, because the shock and vibration levels they are exposed to are lower. This reduces the weight, and thus the cost of obtaining data.

Further features of the invention will be described or will become apparent in the course of the following detailed description.

BRIEF DESCRIPTION OF THE DRAWINGS

The invention will now be described by way of example only, with reference to the accompanying drawings, in which.

DETAILED DESCRIPTION OF THE INVENTION

The instrument package in accordance with the present invention employs payload design load factors which are much lower than can typically be realized with conventional means, because the shock and vibration levels it is exposed to are lower. This reduces the weight, and thus the cost of obtaining data. The principle of the instrument package is that it is given kinetic energy in addition to excess potential energy by a larger and more reliable launch vehicle than the existing sounding rocket. The instrument package can then utilize the excess energy in extending the duration of the flight and in manoeuvring across the area of atmosphere above the earth. The kinetic energy (orbital velocity) allows for longer duration viewing of conditions at a particular altitude than would be possible with a sounding rocket. The excess energy allows lateral motion of the instrument package, resulting from the aerodynamic forces being generated.

Figures 1, 2:
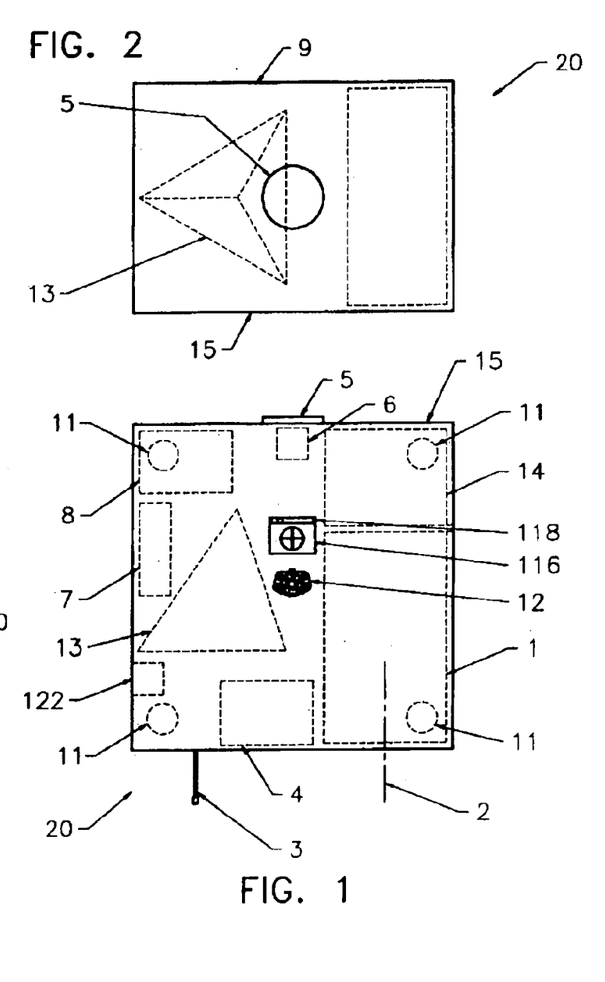
FIG. 1 is a top view of the de-orbit instrument package constructed in accordance with the present invention.
FIG. 2 is a side view of the de-orbit instrument package.
Figure 3:
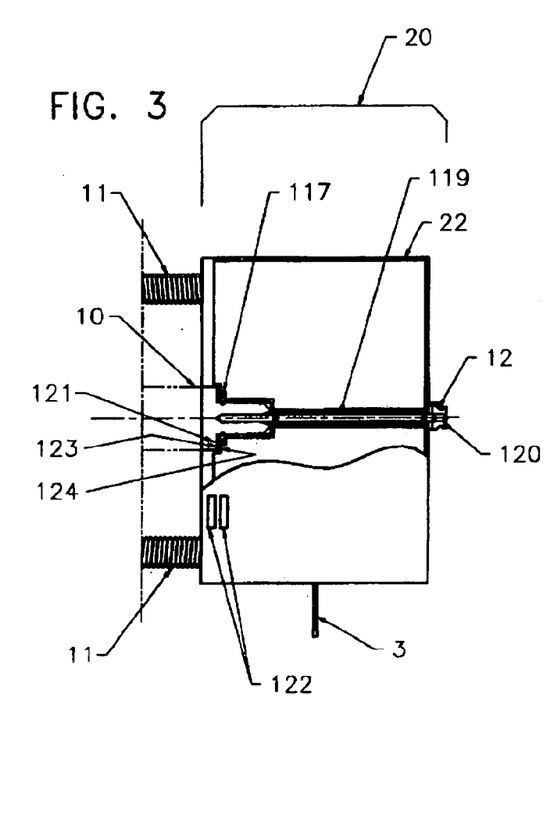
FIG. 3 is an end view of the de-orbit instrument package showing a portion of the housing cut away.

Referring to FIG. 1, the de-orbit instrument package of the invention is generally shown at 20. The instrument package has a housing 22 (shown in FIG. 3) for housing the package instruments and the scientific instruments. In addition the housing, instrument package 20 has a protective cover or thermal 15 such as thermal blankets, radiation shielding or handling protection as appropriate to mission requirements. The instrument package 20 has an on board communication system which comprises communications antenna 3 and communications electronics 4. The instrument package 20 is provided with attitude control system 13 for orientation control. The attitude control system 13 can have four reaction wheels in tetrahedral cluster. Alternatively, the attitude control system 13 may have three reaction wheels, control moment gyros, magnetorquers, etc. The instrument package 20 includes the battery 8 for electrical power. Depending on mission power requirements, the instrument package optionally includes a body-mounted solar array(s) 9 (see FIG. 2). Typical instrument boresight 2 is shown as pointing toward earth. Data can be obtained through this viewing window. The instrument package has volume 1 for a payload or scientific instrument.

The instrument package may be 'released' or launched from the International Space Station (ISS) by Special Purpose Dexterous Manipulator (SPDM) for sensing of characteristics of earth's atmosphere. The payload or instrument package may be designed and built for less mass (less material) than is normally necessary for sounding rockets. Therefore, the instrument package is lighter than conventional devices. For example, the instrument package may weigh less than 50 Kg.

The instrument package can be stored on a space station above the planet, for release and operation at any convenient time with respect to desired observations. The instrument package 20 may be 'launched' from the international Space Station (ISS) via Special Purpose Dexterous Manipulator (SPDM) micro interface 12 for on-orbit robotic manipulation release. Alternatively, the instrument package 20 may be launched via release from a kick-off springs 11. Prior to release the instrument package 20 may be held in place with a tie-down mechanism 10 on Space Station. Tie-down mechanism 10 includes in part a tie-down bolt 119 and a tie down nut 120 which is robotically activated. Tie-down mechanism includes a hard dock interface 121 which includes a tie-down shoulder 123 formed in the tie-down mechanism and a corresponding package shoulder 124. The package shoulder 124 seats in the tie-down shoulder 123 when the tie-down bolt has been fully torqued. Instrument package also includes a soft dock mechanism 117, a soft dock indicator 118 and a robotic handling target 110. Instrument package 20 is also provided with electrical connectors 122 for keep-alive power and data checkout while on Space Station. The spring launch mechanism 11 may form part of tie-down mechanism 10. The instrument package 20 does not include the spring launch mechanism 11 which is external to the housing 22 and protective cover 15 and which is left behind on Space Station after launch.

Once the instrument package 20 is released from Space Station it will begin its decaying orbit to earth. At a selected altitude (based on the particular on board instrument requirements) the instrument package 20 will deploy any additional aerodynamic surfaces, such as a parachute, needed to modify the descent orbit and then begin obtaining data by using cameras and/or other types of scientific instruments. FIG. 1 shows a volume for stowed parachute at 14.

Some processing of the data may be done by the on board computer 7. The location of the instrument package is determined from Global Position System via an antenna 5 and electronics 6. The data is transmitted to either a ground station, or back to the Space Station by the on board communications antenna 3 and electronics 4. The instrument package will continue obtaining data until it is commanded to stop, or until its re-entry into the earth's atmosphere has overheated the components to cause failure.

During ascent to Space Station, the instrument package may be held in place on board the Space Shuttle or other vehicle by launch tie-downs 10. Although 4 separate points are shown in the Figures, the use of a single, larger tie-down is also possible. Alternatively, the instrument package may be packed in foam and stored in Shuttle Mid-Deck Locker or elsewhere on the Shuttle or other vehicle.

Figure 4:
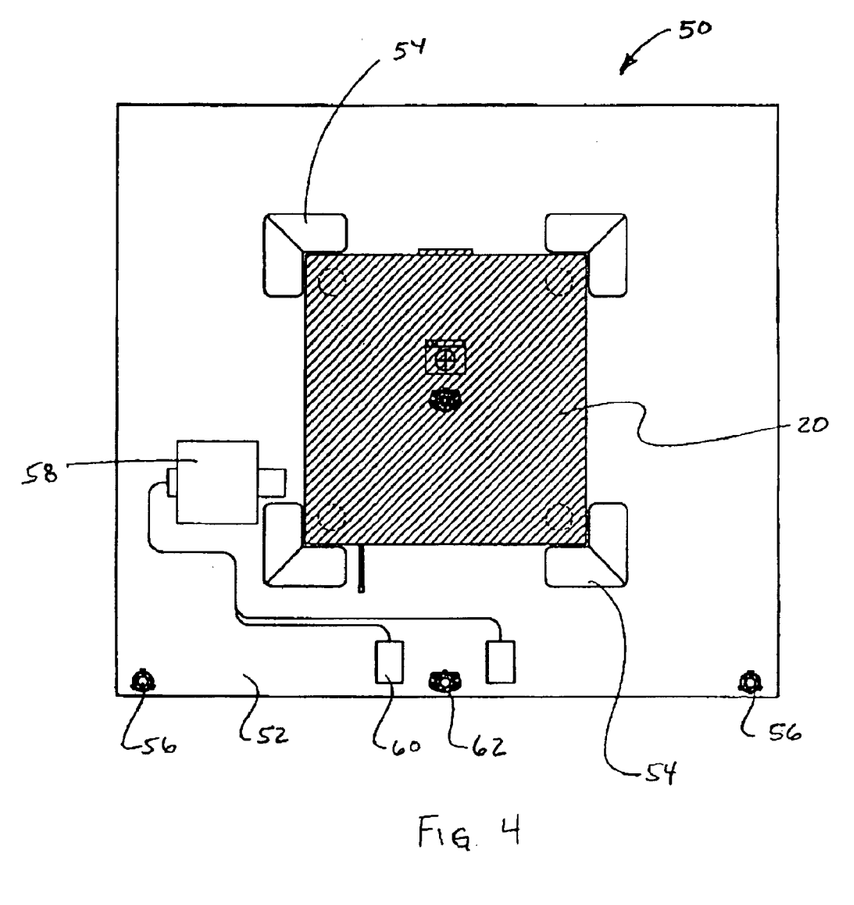
FIG. 4 is a top view of the de-orbit instrument package in a robotic interface.
Figure 5:
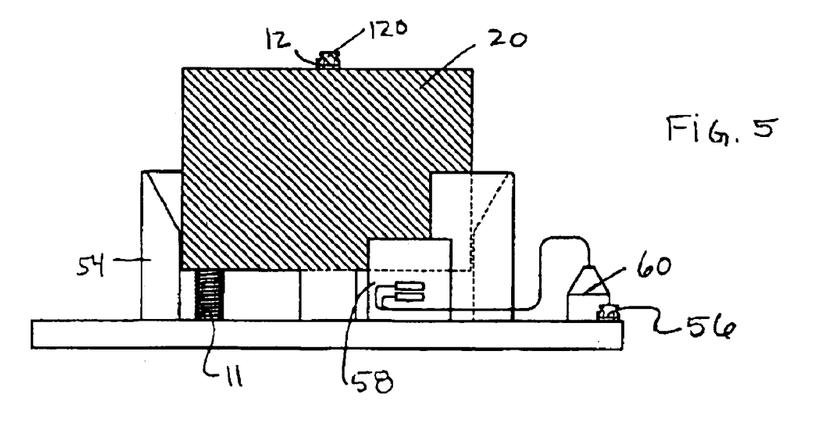
FIG. 5 is a side view of the de-orbit instrument package in the robotic interface of FIG. 4.

A robotic interface or express pallet adapter for instrument package 20 is shown generally at 50 in FIGS. 4 and 5. Robotic interface 50 includes an interface plate 52 with alignment guides 54 extending upwardly therefrom for receiving instrument package 20. The interface plate 52 is tied down using tie-down rods 56. An umbilical mate/demate device 58 is connectable to instrument package 20. The umbilical device 58 is operably connected to electrical connectors 60 on the express pallet adapter 50. The express pallet adapter also includes a handling fixture 62

An example of the handling from the space shuttle to the Space Station and launch therefrom of the instrument package 20 will now be discussed. The package 20 may be stowed in the shuttle with tie-own bolt 119 applying sufficient preload to secure four corners of package 20 to avoid separation under launch loads. The SPDM (Special Purpose Dexterous Manipulator) may be positioned over package 20 using target alignment feature 116. The SPDM is attached to package 20 with micro interface 12 and release tie-down bolt 120 by untorquing robotically.

Once the shuttle reaches the space station the package 20 may be position on the Space Station using the SPDM, over EXPRESS pallet adaptor (or equivalent). The package 20 is inserted into the tie-down mechanism 10 or coarse alignment guides and pushed to the bottom thereof. The balls of robotic soft dock mechanism 117 will slide into grooves in release mechanism (which is permanently mounted to EXPRESS pallet adaptor). An indicator for successful softdock 118 will be visible at target location (which can be observed by SPDM camera). Additional downward force is applied to the package 20 by SPDM (sensed by force moment sensor on SPDM). The tie-down bolt 119 and nut 120 is then torqued using SPDM tool change mechanism, to prescribed torque level. The torquing action causes release springs 11 to be compressed. Tightening of nut 120 may continue until package shoulder 124 bottoms out on tie-down shoulder 123 on tie-down or release mechanism 10. Electrical connectors 122 are engaged to umbilical on the EXPRESS pallet adaptor which provides keep-alive power and some data monitoring.

Once the users are ready to release or launch the package 20 from the Space Station the electrical connectors 122 are disengaged and the tie-down bolt 120 is released to allow kick-off springs 11 to impart delta V to the package 20. The alignment guides or tie-down mechanism 10 reduces wobble.

Figure 8:
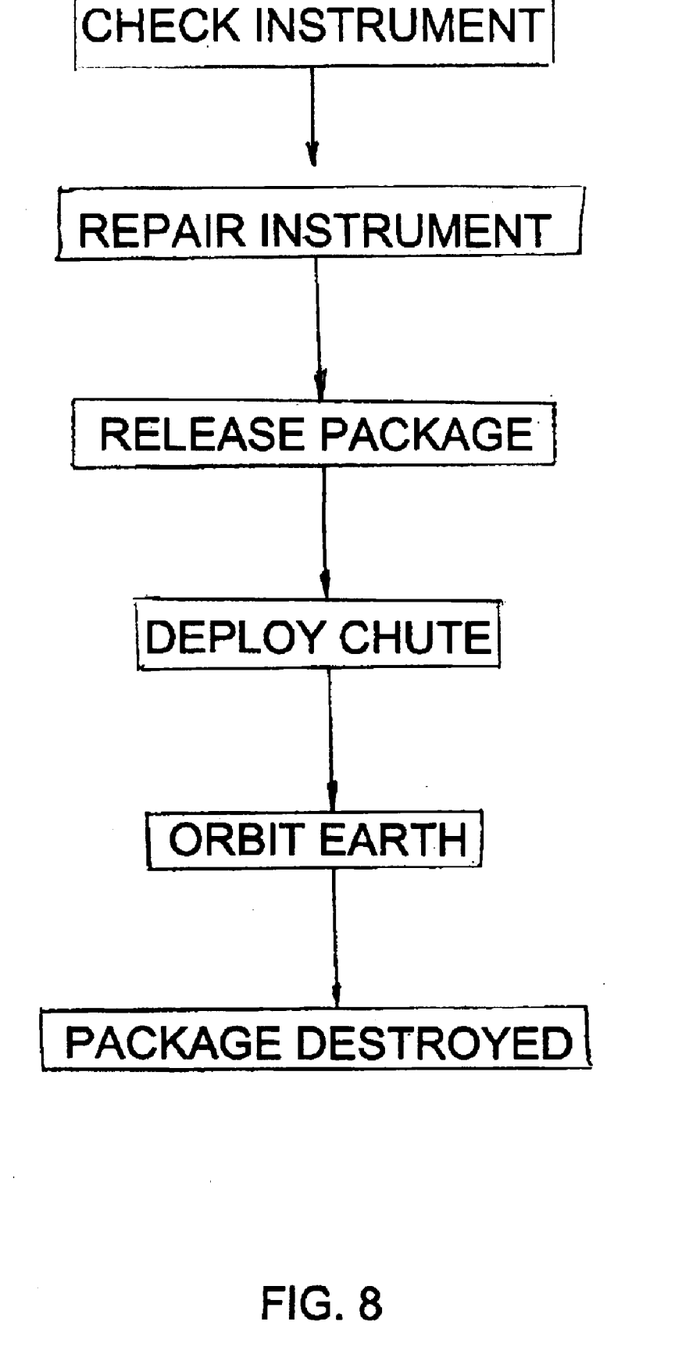
FIG. 8 is a flow chart of the steps for launching the de-orbit instrument package of the present invention.

One method of launching the deorbiting instrument package from the International Space Station or the shuttle or any other space orbiting platform is described generally in the flow chart in FIG. 8. Firstly the instrument package is released from the space orbiting platform. Once the instrument package is far enough away from the space orbiting platform so as not to cause any problems a chute is deployed. Thereafter the instrument package orbits the earth and the scientific instruments therein collect the data and transmit it to the communication receiver. The data may be transmitted to a receiver on the International Space Station or to a receiver on the earth. It may be necessary to bounce the transmission off a satellite in order before it reaches the desired receiver. Preferably the instrument package is destroyed above a predetermined distance from the earth to reduce the risk of any debris. One advantage of the instrument package herein is that both the package instruments and the scientific instruments can be checked prior to launch from the space platform. Where one or more of the instruments is non responsive the instrument package may be opened and where possible the instrument may be repaired. On the other hand if the instrument cannot be fixed that instrument package will not be launched and the cost of the launch will be saved.

The chute is used to speed the de-orbit process through deceleration until the chute disintegrates. The chute will also act to stabilise the instrument package about pitch and yaw axes, much as a gravity gradient design control system does. This initial control approach (prior to chute disintegrating) will reduce power consumption for the initial stages. The combination of chute and active control elements (reaction wheels/momentum wheels/magnetorquer) along with the GPS monitoring will allow for course corrections to system orbit. It will be appreciated by those skilled in the art that in general the de-orbit instrument package is not intended for either safe landing or recovery. That is, it is intended to disintegrate. The chute on the instrument package is intended to reduce the time spent in orbit, prior to disintegration. Its design is based on the speed with which the instrument package can get down to a specified altitude for data gathering. For the de-orbit instrument package, the chute is to modify the orbit, generally to increase the rate at which the de-orbit instrument package reaches near earth conditions. It is anticipated and desired that the de-orbit instrument package will heat up and be destroyed in the atmosphere, avoiding any landing. It is also anticipated that modifying the orbit will allow for lateral orbit manoeuvres. The detailed chute configuration, in combination with the delta V provided by robotic release, as well as the position of International Space Station at release time will determine the orbit range of the instrument package.

In contrast prior art chutes have been used for aerobraking. That is they have been used to slow down the space craft and modify the orbit for an easier landing.

Figure 6:
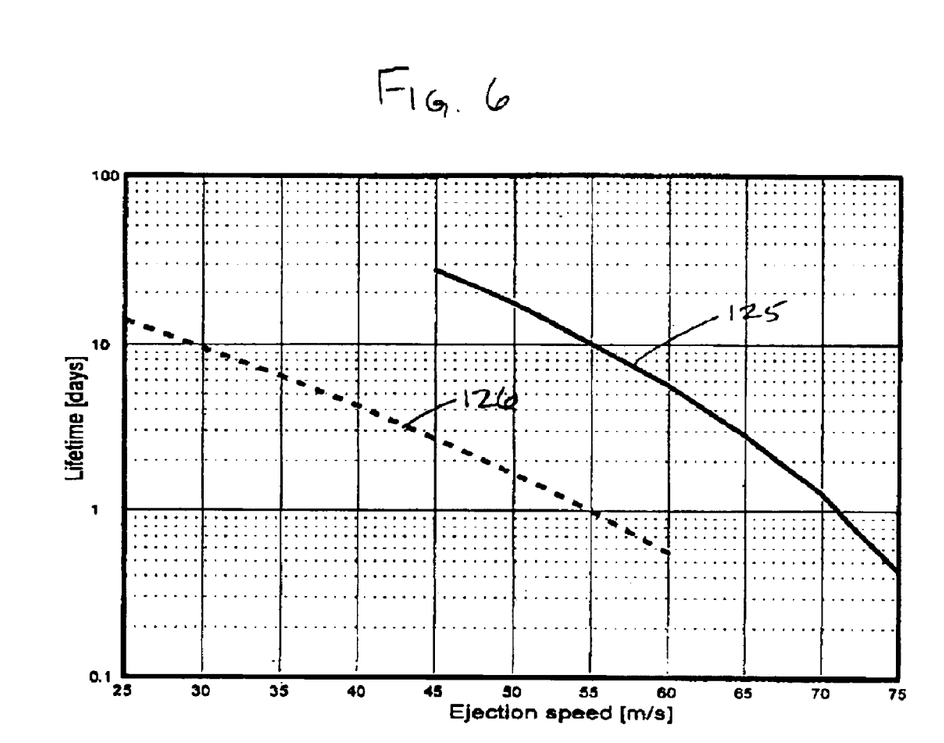
FIG. 6 is a graph showing de-orbit lifetime versus ejection speed of a simulation of a de-orbit of the de-orbit instrument package from an international space station.

The initial orbit of the instrument package 20 will be similar to that of the Space Station or the Shuttle itself (which takes place over a significant portion of the populated planet of earth). It can be modified by a combination of initial launch characteristics and the aerodynamics of earth's atmosphere at altitudes below (by use of parachutes or other aerodynamic surfaces) in addition to small amount of control ability provided by any on board thrusters. A graph of the showing de-orbit lifetime versus ejection speed of a simulation of a de-orbit of the de-orbit instrument package from an international space station is shown in FIG. 6. The graph shows the lifetime after ejection as a function of retrograde ejection speed relative to Space Station. Typical release point from typical Space Station orbit (station location at release, 4126.2,2725.8, 4596.5 km, velocity −5.905, 3.926, 2.959 km/s in Earth-Centered-Inertial system). US Standard Atmosphere. Assuming an instrument package weight of 20 kg the lifetime is shown at 125 for $C_D A$=0.5 m$^2$ and at 126 for $C_D A$=5 m$^2$.

The available time for data gathering provided by the instrument package according to the invention is significantly extended compared to that provided by instruments using sounding rockets. For example, the available time for observation can be several hours and days, rather than seconds or minutes. The extended period of observation is helpful for some types of measurements, but required for other types. However, it will be appreciated that the available time for data gathering will be significantly less that than provided by microsats which may by months or years.

Figure 7:
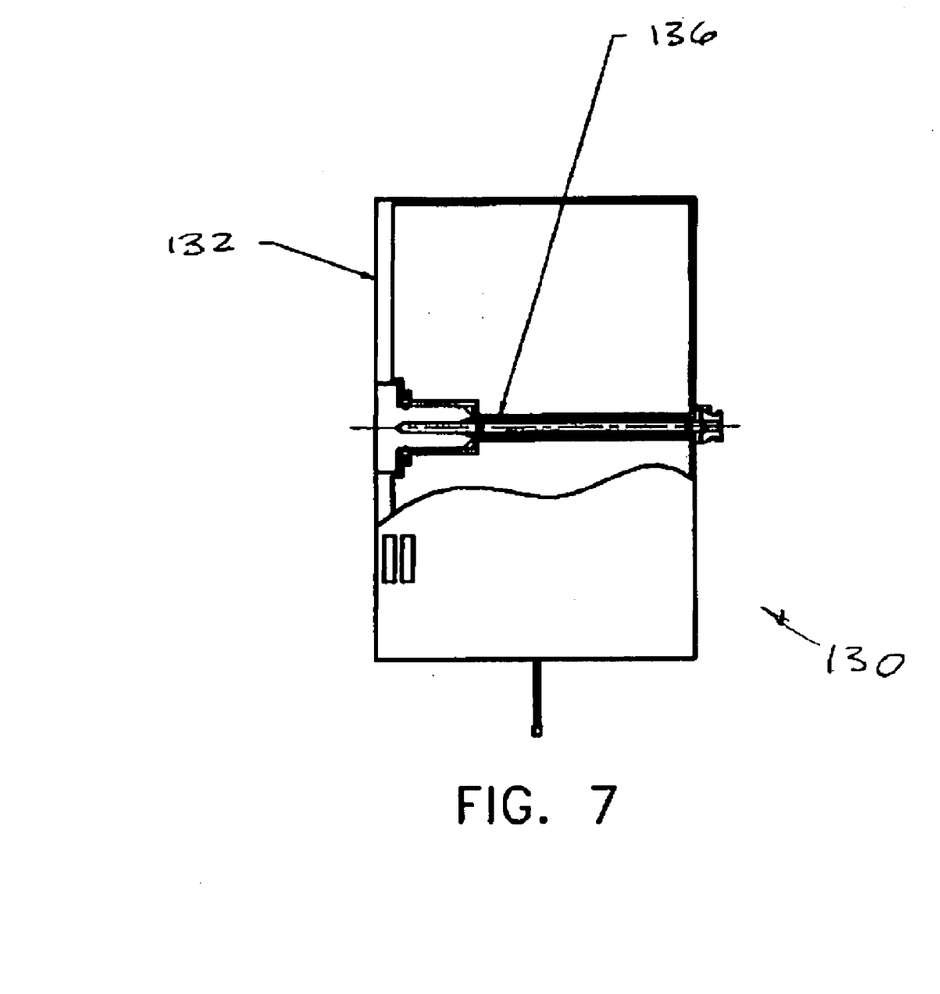
FIG. 7 is an end view of an alternate embodiment of the de-orbit instrument package showing a portion of the housing cut away.

An alternate preferred embodiment of the instrument package is shown generally in FIG. 7 at 130. The instrument package shown herein is very similar to that shown in FIGS. 1–5 and described above. Instrument package 130 has a base plate 132 and outer walls 134. The base plate 132 has stiffness and thermal inertial properties that are greater than those of the outer walls 134. The base plate is designed to have the package instruments and the scientific instruments attached thereto. Instrument package 130 has a centre beam 136. Centre beam 136 extends from the base plate 132 to the opposed outer wall. Preferably the outer walls 134 are in modules so that at least one module may be removed to provide access to the instruments inside.

The single, strong base plate 132 provides a simple thermal sink, which reduces electronic component failure potential, simplifying thermal design. This strong base plate ensures that all vibration sensitive components (and associated cabling) can be mounted to at the lower vibration location (lowest Q-factor). This is an extremely important consideration in tying down cabling and connectors. The centre beam support 136 provides an additional hard point for heavy components which should be mounted in centre (like batteries). The overall configuration allows for light weight external panels over frame structure, with a stiff base plate 132. The strong structural support for launch and robotic handling are coincident.

In contrast conventional satellites and microsat components must be designed to sustain very high vibration levels due to the separation conditions from their rocket. These high vibration forces (as from explosive bolt separation 'kicks') are often very localized, but until the space craft design is complete, it is often unclear if a component will experience that high level, so it must be designed to withstand it.

It will be appreciated by those skilled in the art that the instrument package provides more flexibility in the design of the payload. That is, for a given volume, the shape can be varied as needed for the on board instrument. The shape of the instrument package can also be modified to suit aerodynamic force considerations, depending on the nature and objectives of the mission. The instrument package of the present invention may be modular such that the nonscientific instrumentation will be standard (with changes to aerodynamic surfaces), but the shape of the instrument package will be more inclined to be free of distinct corners. The simple load/volume design allows for easy access to components within the instrument package. This affords quicker repairs to be made during integration and testing, as well as after arrival on-orbit.

Further the instrument package 20 of the present invention includes a number of advantages. For example, the release of the package from a manned orbiting space station allows for check-out and repair of the package from any damage that may have occurred during launch from terrestrial environment, or under storage conditions prior to release from the space station. The potential storage of the package on a manned space station allows for check-out of the package to ensure its major systems have remained functional. There is the potential to repair these systems if they are damaged. The potential storage of the package inside a manned space station, coupled with its relatively short operational life, suggests that the electronics devices will not have to be red hardened. This results in lower cost, and in the ability to utilize the most state of the art components. Further the potential storage of the package inside a manned space station allows the users to respond quickly to say unusual weather pattern occurrences such as an earth quake or volcano eruption and to begin collecting data very quickly.

The instrument package of the present invention can be used in a wide variety of application such as earth observation: either entertainment, scientific or military. In addition the skin of the instrument package may also include marketing/advertising logos which would be viewable by Space Station and Mobile Servicing System (MSS) cameras during the launch and thereafter as long as the instrument package is viewable.

Further, it will be appreciated by those skilled in the art that although the launching requirements for the instrument package 20 of the present invention are described in the context of being launched from the Space Station it could be launched from other types of space ships such as the shuttle.

As used herein, the terms "comprises" and "comprising" are to be construed as being inclusive and opened rather than exclusive. Specifically, when used in this specification including the claims, the terms "comprises" and "comprising" and variations thereof mean that the specified features, steps or components are included. The terms are not to be interpreted to exclude the presence of other features, steps or components.

It will be appreciated that the above description related to the invention by way of example only. Many variations on the invention will be obvious to those skilled in the art and such obvious variations are within the scope of the invention as described herein whether or not expressly described.

What is claimed as the invention is:

1. A space launched de-orbit instrument package for carrying on board observation instruments comprising:

a housing including a protective skin and adapted to be launched from space into a de-orbit pattern, the housing having one side and an opposing side and a tie down mechanism extending from the one side to the opposing side;

a power supply secured in the inside of the housing;

a communication system operably connected to the power supply for transmitting data to a location remote from the instrument package; and an internal instrument volume inside the housing adapted to receive at least one scientific instrument which is connectable to the communication system.

2. A space launched de-orbit instrument package as claimed in claim 1 further including an on board control system operably connected to the power supply.

3. A space launched de-orbit instrument package as claimed in claim 2 further including an attitude control system operably connected to the on board control system.

4. A space launched de-orbit instrument package as claimed in claim 3 further including a global positioning system connected to the communication system.

5. A space launched de-orbit instrument package as claimed in claim 4 wherein the on board control system is a computer.

6. A space launched de-orbit instrument package as claimed in claim 5 further including solar arrays mounted on the outside of the housing.

7. A space launched de-orbit instrument package as claimed in claim 5 further including a parachute mounted in the housing and deployable outside the housing.

8. A space launched de-orbit instrument package as claimed in claim 5 further including a launch mechanism attachable to the outside of the housing and wherein the launch mechanism forms part of the tie down mechanism.

9. A space launched de-orbit instrument package as claimed in claim 8 wherein the launch mechanism is robotically activatable.

10. A space launched de-orbit instrument package as claimed in claim 9 wherein the launch mechanism includes at least one spring, at least one tie-down bolt and a corresponding tie-down nut.

11. A space launched de-orbit instrument package as claimed in claim 8 further including a Special Purpose Dexterous Manipulator micro interface forming part of the tie down mechanism.

12. A space launched de-orbit instrument package as claimed in claim 5 wherein the payload of the instrument package is less than 40 kg.

13. A space launched de-orbit instrument package as claimed in claim 5 wherein the housing has a viewing window formed therein and the internal instrument volume is proximate thereto whereby the instrument positioned in the instrument volume looks out the window.

14. A space launched de-orbit instrument package as claimed in claim 5 further including a target alignment device.

15. A space launched de-orbit instrument package as claimed in claim 3 wherein the attitude control system includes devices chosen from the group consisting of reaction wheels, control moment gyros, magnetorquers and a combination thereof.

16. A space launched de-orbit instrument package as claimed in claim 1 wherein the instrument package is adapted to be launched from the International Space Station.

17. A space launched de-orbit instrument package as claimed in claim 1 wherein the instrument package is adapted to be launched from the space shuttle.

18. A space launched de-orbit instrument package as claimed in claim 1 wherein the payload of the instrument package is less than 40 kg.

19. A space launched de-orbit instrument package for carrying on board observation instruments adapted to be launched from a space orbiting platform having a robotic interface comprising:

a housing including a protective skin and adapted to be launched from space into a de-orbit pattern, the housing having a base plate and outer walls and in which the base plate has stiffness and thermal inertial properties that are greater than those of the outer walls;

a tie down mechanism adapted to releasably attach the housing to the space orbiting platform;

a robotic interface adapted to be releasably connected to the robotic interface of the space orbiting platform;

a launch mechanism attachable to the outside of the housing;

a power supply secured in the inside of the housing;

a communication system operably connected to the power supply for transmitting data to a location remote from the instrument package; and an internal instrument volume inside the housing adapted to receive at least one scientific instrument connectable to the communication system and the at least one scientific instrument is adapted to be attached to the base plate.

20. A space launched de-orbit instrument package as claimed in claim 19 wherein the tie down mechanism includes a centre beam which extends from the base plate to an opposed side of the housing.

21. A space launched de-orbit instrument package as claimed in claim 20 further including an on board control system operably connected to the power supply and connected to the base plate.

22. A space launched de-orbit instrument package as claimed in claim 21 further including an attitude control system operably connected to the on board control system and connected to the base plate.

23. A space launched de-orbit instrument package as claimed in claim 22 further including a global positioning system connected to the communication system and connected to the base plate.

24. A space launched de-orbit instrument package as claimed in claim 23 wherein the on board control system is a computer.

25. A space launched de-orbit instrument package as claimed in claim 24 further including solar arrays mounted on the outside of the housing.

26. A space launched de-orbit instrument package as claimed in claim 24 further including a parachute mounted in the housing and deployable outside the housing.

27. A space launched de-orbit instrument package as claimed in claim 24 wherein the launch mechanism forms part of the tie down mechanism.

28. A space launched de-orbit instrument package as claimed in claim 27 wherein the launch mechanism is robotically activatable.

29. A space launched de-orbit instrument package as claimed in claim 28 wherein the launch mechanism includes at least one spring, at least one tie-own bolt and a corresponding tie-down nut.

30. A space launched de-orbit instrument package as claimed in claim 27 further including a Special Purpose Dexterous Manipulator micro interface forming part of the tie down mechanism.

31. A space launched de-orbit instrument package as claimed in claim 24 wherein the payload of the instrument package is less than 40 kg.

32. A space launched de-orbit instrument package as claimed in claim 24 wherein the housing has a viewing window formed therein and the internal instrument volume is proximate thereto whereby the instrument positioned in the instrument volume looks out the window.

33. A space launched de-orbit instrument package as claimed in claim 24 further including a target alignment device.

34. A space launched de-orbit instrument package as claimed in claim 22 wherein the attitude control system includes devices chosen from the group consisting of reaction wheels, control moment gyros, magnetorquers and a combination thereof.

35. A space launched de-orbit instrument package as claimed in claim 19 wherein the instrument package is adapted to be launched from the International Space Station.

36. A space launched de-orbit instrument package as claimed in claim 19 wherein the instrument package is adapted to be launched from the space shuttle.

37. A space launched de-orbit instrument package as claimed in claim 19 wherein the payload of the instrument package is less than 40 kg.

38. A process for launching a deorbiting instrument package from a space orbiting platform, the package having a chute, a communication system, and instruments including control instruments and at least one scientific instrument, the at least one scientific instrument being operably connected to the communication system and comprising the steps of:
    robotically releasing the instrument package from the space orbiting platform;
    deploying the chute when the instrument package is at a predetermined distance from the space orbiting platform thereby slowing down and stabilizing the instrument package;
    orbiting the earth and collecting data by the instruments and transmitting it to a communication receiver; and
    destroying the instrument package above a predetermined distance from the earth.

39. A process for launching a deorbiting instrument package as claimed in claim 38 wherein the platform is the International Space Station.

40. A process for launching a deorbiting instrument package as claimed in claim 39 wherein the communication receiver is in the International Space Station.

41. A process for launching a deorbiting instrument package as claimed in claim 38 wherein the platform is the space shuttle.

42. A process for launching a deorbiting instrument package as claimed in claim 38 wherein the communication receiver is on the earth.

43. A process for launching a deorbiting instrument package as claimed in claim 38 further including the step of conducting a check of the instruments prior to launching the instrument package.

44. A process for launching a deorbiting instrument package as claimed 43 further including the step of opening the instrument package and repairing any responsive instrument.

\* \* \* \* \*